(12) United States Patent
Lee

(10) Patent No.: US 6,909,621 B2
(45) Date of Patent: Jun. 21, 2005

(54) SYSTEM FOR AND METHOD OF CONTROLLING STANDBY POWER

(75) Inventor: Seung-Kwan Lee, Suwon (KR)

(73) Assignee: Samsung Electronics Co., Ltd., Suwon-si (KR)

(*) Notice: Subject to any disclaimer, the term of this patent is extended or adjusted under 35 U.S.C. 154(b) by 25 days.

(21) Appl. No.: 10/269,874

(22) Filed: Oct. 15, 2002

(65) Prior Publication Data

US 2003/0214825 A1 Nov. 20, 2003

(30) Foreign Application Priority Data

May 15, 2002 (KR) .................................. 10-2002-0026688

(51) Int. Cl.[7] .............................................. H02M 1/00
(52) U.S. Cl. .............................. 363/81; 363/84; 307/64; 307/86
(58) Field of Search .............................. 307/44, 64, 86; 363/76, 78–81, 84, 89, 125, 127

(56) References Cited

U.S. PATENT DOCUMENTS

| | | | |
|---|---|---|---|
| 5,140,511 A | | 8/1992 | Lee et al. |
| 5,477,279 A | * | 12/1995 | Chang .......................... 348/730 |
| 6,229,724 B1 | * | 5/2001 | Virtanen ....................... 363/89 |
| 6,430,062 B1 | * | 8/2002 | Shin ........................ 363/21.01 |
| 6,438,060 B1 | | 8/2002 | Li et al. |

* cited by examiner

Primary Examiner—Michael Sherry
Assistant Examiner—Gary L. Laxton
(74) Attorney, Agent, or Firm—Staas & Halsey LLP

(57) ABSTRACT

An apparatus for and a method of controlling standby power to minimize energy consumption in a standby mode. The standby power control apparatus includes a control unit, a power supply unit, a constant voltage unit, and a standby power generation unit. The control unit controls an overall operation of the system. The power supply unit converts an alternating current (AC) power into a direct current (DC) voltage and outputs the DC voltage to a load. The constant voltage unit drops the output DC voltage of the power supply unit and provides the control unit with the dropped output voltage. The standby power generation unit drops the output voltage of the power supply unit from a first value to a second value lower than the first value if the system is switched to a standby mode.

10 Claims, 7 Drawing Sheets

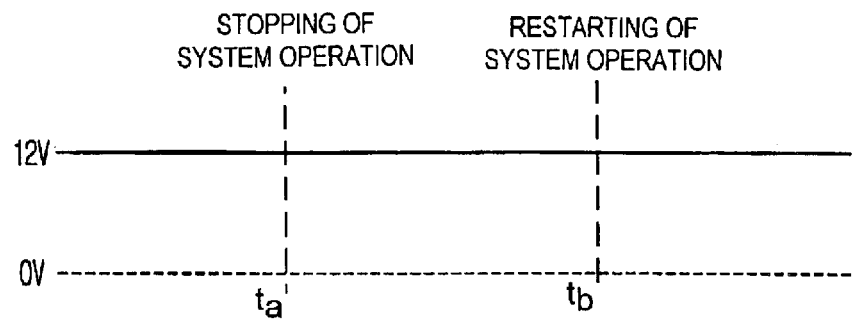
FIG. 2A Node N1 (PRIOR ART)
FIG. 2B Node N2 (PRIOR ART)
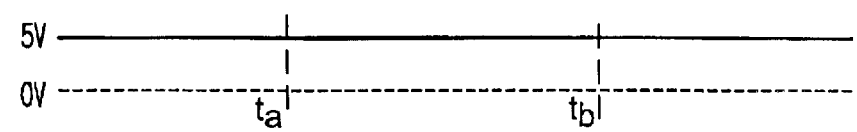
FIG. 2C Node N3 (PRIOR ART)
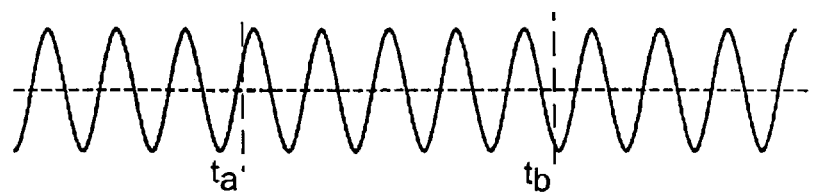
FIG. 2D Node N4 (PRIOR ART)
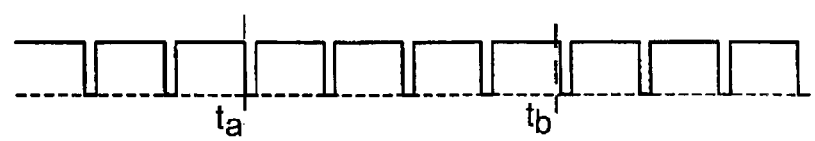

AC POWER DETECTION UNIT
(312)

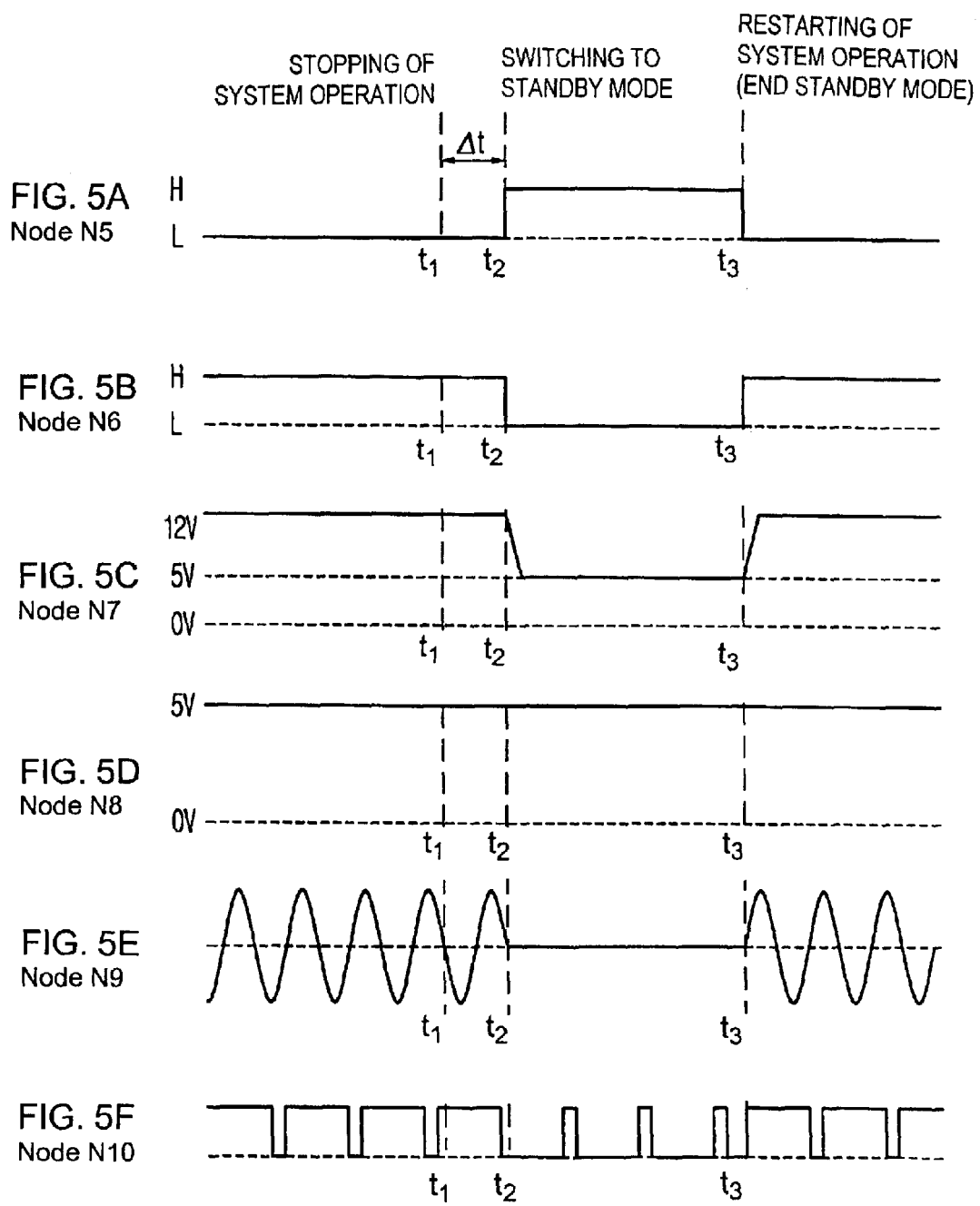

SYSTEM FOR AND METHOD OF CONTROLLING STANDBY POWER

CROSS-REFERENCE TO RELATED APPLICATIONS

This application claims the benefit of Korean Application No. 2002-26688 filed May 15, 2002, in the Korean Industrial Property Office, the disclosure of which is incorporated herein by reference.

BACKGROUND OF THE INVENTION

1. Field of the Invention

The present invention relates generally to power consumption control of a system, and more particularly to power consumption control of a system having a standby mode for saving power.

2. Description of the Related Art

FIG. 1 is a schematic block diagram illustrating a conventional power control apparatus. An overall system 100 of FIG. 1 includes a conventional power control apparatus which supplies power to a load 104 through a power supply unit 102. As shown in FIG. 1, in the overall system 100, the power supply unit 102 converts Alternating Current (AC) power into Direct Current (DC) power and provides the load 104 of the conventional system 100 with the DC power.

The power supply unit 102 is a Switching Mode Power Supply (SMPS) and normal AC power is input to the power supply unit 102. An output voltage level of the power supply unit 102 is controlled to 12 volts DC by operations of a zener diode 114, whose rated voltage is 12 volts, and a feedback control unit 110. Since the rated voltage of the zener diode 114 is 12 volts, a voltage is fed back to the control unit 110 if a voltage across the zener exceeds 12 volts. The feedback control unit 110 stops the operation of the power supply unit 102 if the output voltage of the power supply unit 102 is found to exceed 12 volts by observing the output voltage level.

A constant voltage unit 106 drops the 12 volts DC output from the power supply unit 102 to 5 volts DC, and provides a control unit 108 with the 5 volts DC. The 5 volts DC output from the constant voltage unit 106 is the operational voltage of the control unit 108. The constant voltage unit 106 is a kind of voltage regulator, and serves to obtain output voltage of a desired level by dissipating heat corresponding to a difference between an input voltage and a target output voltage, thus consuming the difference.

An AC power detection unit 112 observes whether normal AC power is input to the power supply unit 102, and provides the control unit 108 with observation results. The AC power detection unit 112 determines whether input AC power is normal by zero point detection of the AC power. Additionally, since the period of the AC power is constant, the motor rotation velocity and motor driving member of the load 104 and the like are precisely controllable by the zero point detection.

FIGS. 2A through 2D are waveform diagrams illustrating electrical characteristics of portions of the conventional system 100, that is, the voltage of nodes N1 through N4 as shown in FIG. 1. At node N1, the output voltage of the power supply unit 102 is always maintained at 12 volts as shown in FIG. 2A. At node N2, the output voltage of the constant voltage unit 106 is always maintained at 5 volts as shown in FIG. 2B. At node N3, AC power is input to the AC power detection unit 112 in a form of a wave as shown in FIG. 2C. At node N4, a pulse signal, as shown in FIG. 2D, generated within the power supply unit 102 determines a value of the output voltage at node N1.

In FIGS. 2A 2D, $t_a$ and $t_b$ indicate a beginning of an operation stopping period and a beginning of an operation restarting period, respectively, of the system 100. The operation stopping period $t_a$ to $t_b$ of the system 100 designates an idle state in which the load 104 is not required to operate. In such an operation stopping period, the control unit 108 observes whether an external input occurs and whether the external input possesses data required for the operation of the system 100, so the control unit 108 must be activated. Upon receipt of the required data, the system 100 is restarted at time $t_b$.

However, in accordance with the prior art, while the system 100 is not in operation, the voltage of 12 volts is continuously provided to the constant voltage unit 106 and AC power is continuously provided to the AC power detection unit 112. Accordingly, in the constant voltage unit 106, unnecessary power consumption occurs in the process of dropping the 12 volts to the 5 volts and a large amount of heat is generated, so the performance of the conventional system 100 is deteriorated. Additionally, unnecessary power consumption occurs in the AC power detection unit 112, further contributing to system inefficiency.

SUMMARY OF THE INVENTION

Accordingly, the present invention has been made keeping in mind the above and other problems occurring in the prior art, and an object of the present invention is to provide a system for and a method of controlling standby power, which, where the system is switched to a standby mode, drops the output voltage of a power supply unit to a minimum operational voltage level of a control unit and cuts off AC power provided to a AC power detection unit.

Additional objects and advantages of the invention will be set forth in part in the description which follows, and, in part, will be obvious from the description, or may be learned by practice of the invention.

In order to accomplish the above and other objects, the present invention provides an apparatus for controlling standby power comprising a control unit which controls an overall operation of a system; a power supply unit which converts an AC voltage into a DC voltage and outputs the DC voltage to a load; a constant voltage unit which drops the DC output voltage of the power supply unit and provides the control unit with the dropped output voltage; and a standby power generation unit which drops the DC output voltage of the power supply unit from a first value to a second value lower than the first value if the system is switched to a standby mode.

In order to accomplish the above and other objects, the present invention provides a method of controlling standby power in a system, the system having a control unit which controls an overall operation of the system, a power supply unit which converts an AC voltage into a first DC voltage, and a constant voltage unit which drops the first DC voltage to a second DC voltage, wherein the method comprises: counting an operation stopping time of the system if the operation of the system is stopped; and if the operation stopping time of the system exceeds a preset reference time, converting an operation mode of the system into a standby mode and dropping a value of the first DC voltage to a value of the second DC voltage.

BRIEF DESCRIPTION OF THE DRAWINGS

The above and other objects, features and advantages of the present invention will be more clearly understood from the following detailed description taken in conjunction with the accompanying drawings, in which:

FIGS. 2A, through 2D are waveform diagrams of voltages at nodes N1 through N4, respectively, shown in FIG. 1;

FIGS. 5A through 5F are waveform diagrams of voltages at nodes N5 through N10, respectively, shown in FIG. 3.

DESCRIPTION OF THE PREFERRED EMBODIMENTS

Figure 1:
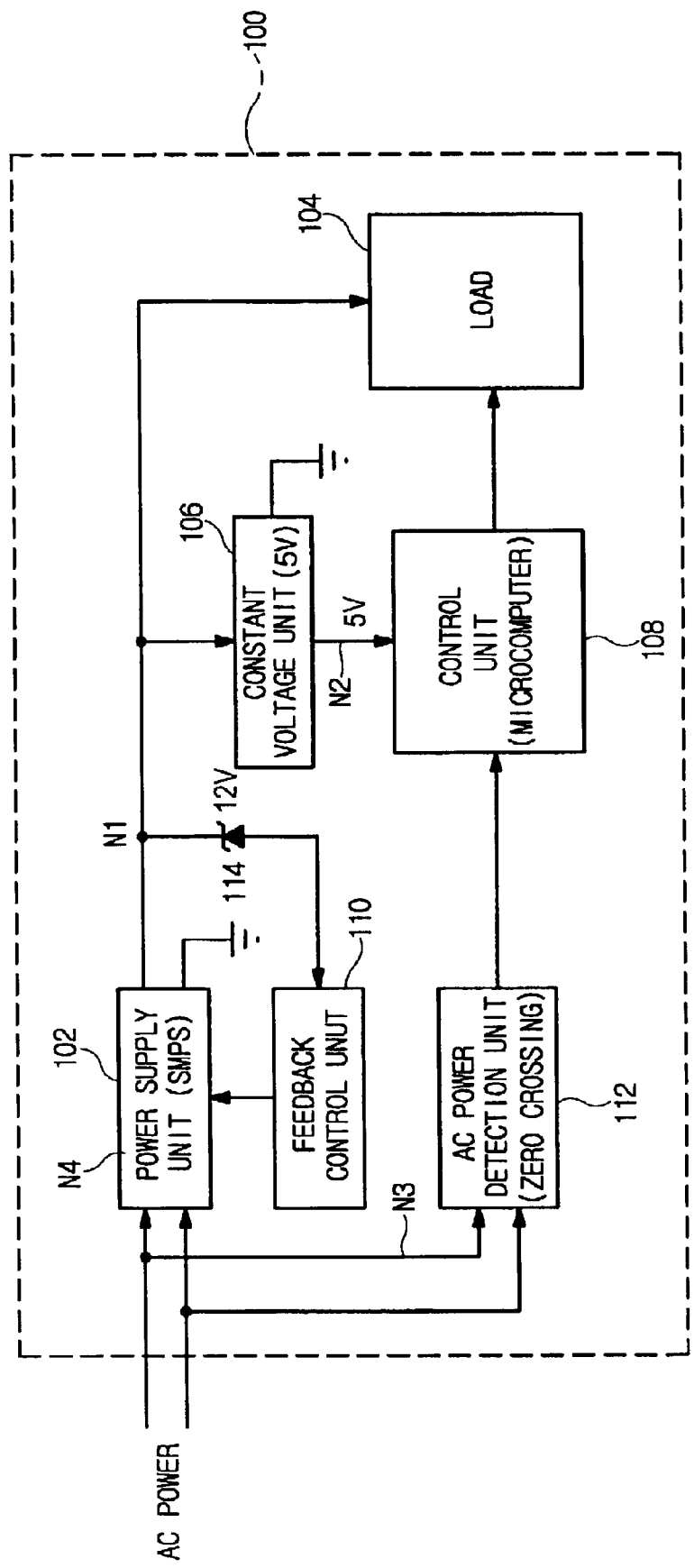
FIG. 1 is a schematic block diagram illustrating a conventional power control apparatus.

Reference will now be made in detail to the present embodiments of the present invention, examples of which are illustrated in the accompanying drawings, wherein like reference numerals refer to like elements throughout.

With reference to FIGS. 3 through 6, an apparatus and method for controlling standby power in accordance with a preferred embodiment of the present invention is described below.

Figure 3:
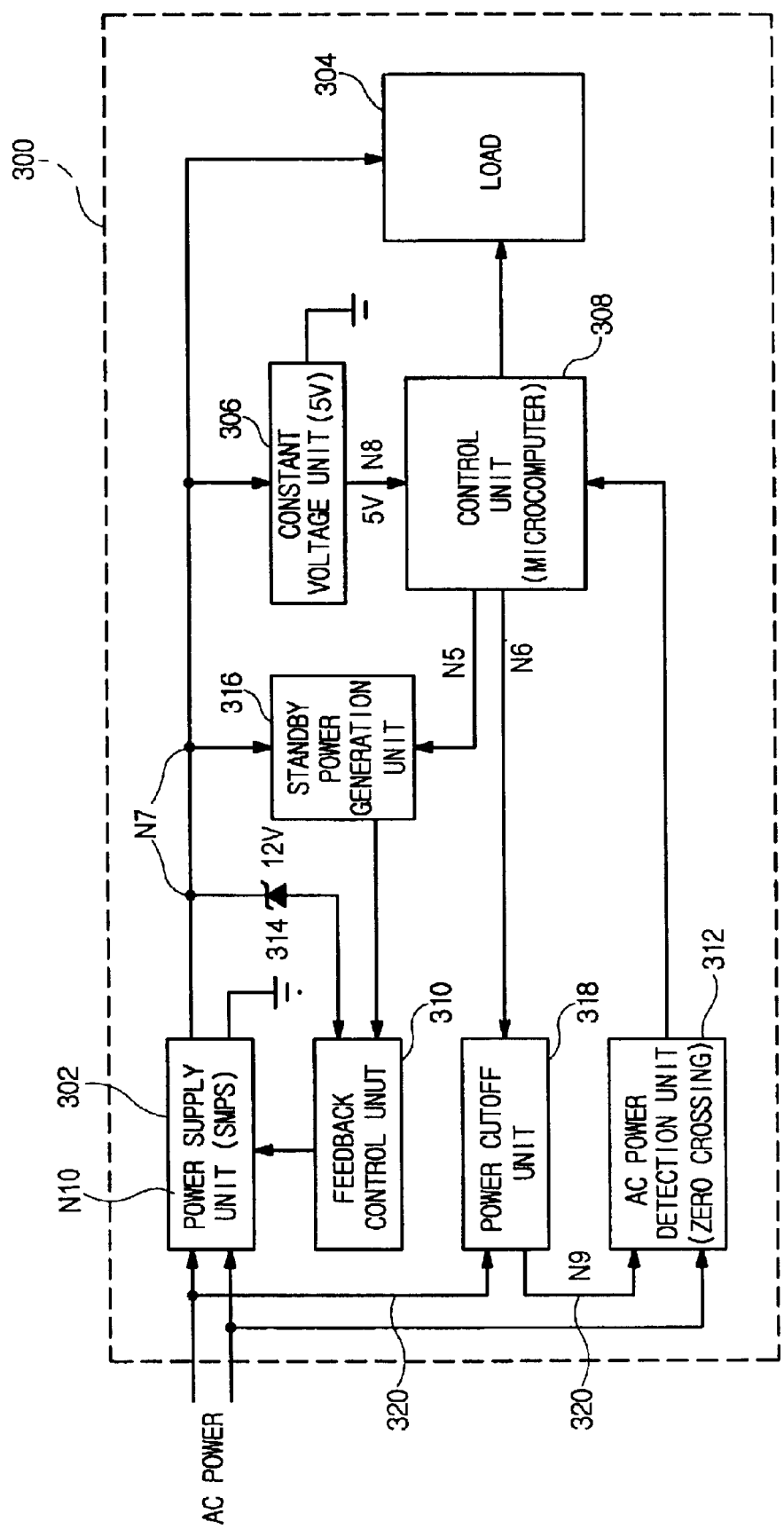
FIG. 3 is a schematic block diagram illustrating an apparatus for controlling standby power in accordance with an embodiment the present invention.

FIG. 3 is a schematic block diagram illustrating the apparatus for controlling standby power in accordance with the present invention. As shown in FIG. 3, in an overall system 300 including the standby power control apparatus of the present invention, unnecessary power consumption is reduced in a constant voltage unit 306 by dropping output voltage N7 of the power supply unit 302 using a standby power generation unit 316 while the system 300 is in a standby mode, and in a AC power detection unit 312 by cutting off the power supplied to the AC power detection unit 312 by using a power cutoff unit 318.

The system 300 of the present invention is switched to the standby mode if an operation stopping time of the system 300, for which a load 304 is not operated, exceeds a preset reference time while power is on. In this standby mode, all the component elements of the system 300 except a control unit 308, the standby power generation unit 316 and the power cutoff unit 318 are not activated. If, in the standby mode, external input occurs, the activated control unit 308 generates a control signal to drive the load 304.

The power supply unit 302 of the system 300 converts AC power into a DC voltage and provides the load 304 with the DC voltage. A Switched mode power supply (SMPS) is employed as the power supply unit 302 and normal AC power is input to the power supply unit 302. In the normal operation mode of the system 300, the output voltage of the power supply unit 302 is restricted to 12 volts DC by the operation of a zener diode 314, whose rated zener voltage is 12 volts, and a feedback control unit 310. Since the rated voltage of the zener diode 314 is 12 volts, a voltage is input to the feedback control unit 310 if the output voltage at node N7 exceeds 12 volts. The feedback control unit 310 stops the operation of the power supply unit 302 if the output voltage level of the power supply unit 302 is found to exceed 12 volts by observing the output voltage level. Unlike the normal operation mode, in the standby mode of the system 300, the control unit 308 controls the standby power generation unit 316 so that the output voltage of the power supply unit 302 is restricted to 5 volts, that is, the operation voltage of the control unit 308.

The constant voltage unit 306 drops the 12 volts DC output from the power supply unit 302 to 5 volts DC, and provides the control unit 308 with the 5 volts DC. The 5 volts DC output from the control unit 308 is the operation voltage of the control unit 308. The constant voltage unit 306 is a kind of voltage regulator, and serves to obtain the output voltage of a desired level by dissipating heat corresponding to a difference between input voltage and target output voltage, thus consuming the difference. In the standby mode of the system 300 of the present invention, the input voltage of the constant voltage unit 306 is 5 volts, so there is no surplus voltage that is consumed as heat in the constant voltage unit 306. Accordingly, there is no heat generation caused by the operation of the constant voltage unit 306 in the standby mode of the present invention.

The AC power detection unit 312 observes whether normal AC power is inputted to the power supply unit 302, and provides the control unit 308 with the observed results. The AC power detection unit 312 determines whether the AC power signal is not normal using zero point detection of the AC power signal. Additionally, since the period of the AC power is constant, the motor rotation velocity and motor driving member of the load 304 and the like are precisely controllable by the zero point detection. Where the system 300 is switched to the standby mode, the control unit 308 drives the power cutoff unit 318 so that power provided to the AC power detection unit 312 is cut off.

Figure 4A:
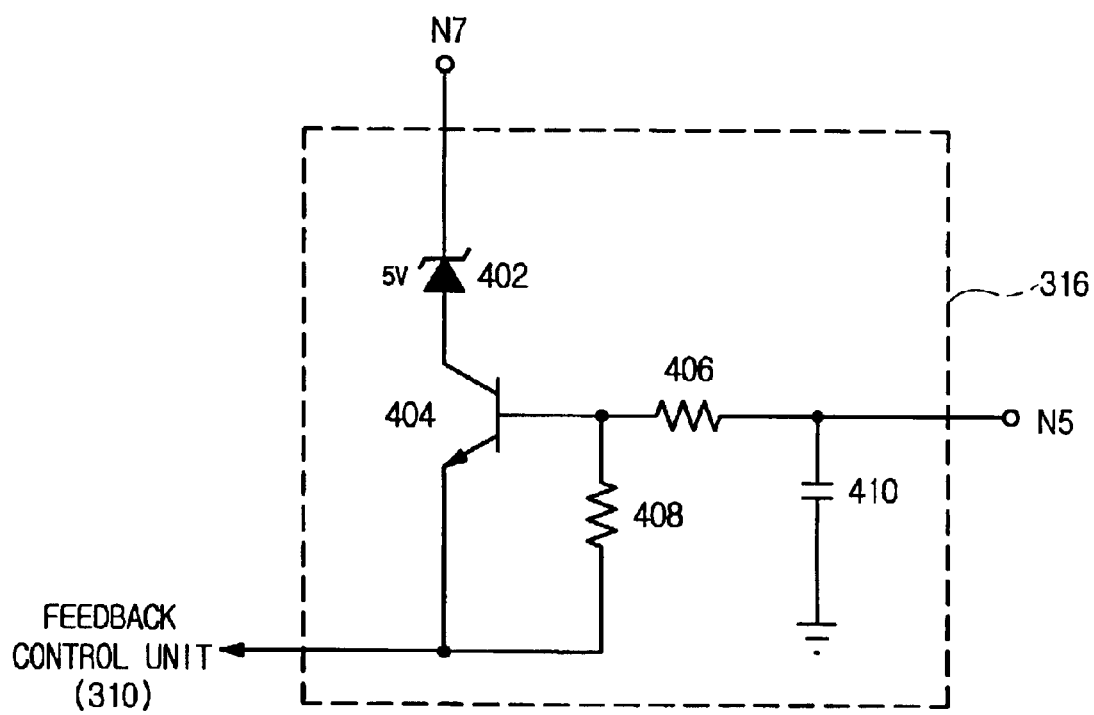
FIG. 4A is a circuit diagram illustrating a standby power generation unit of the standby power control apparatus shown in FIG. 3.

FIG. 4A is a circuit diagram illustrating a standby power generation unit 316 of the standby power control apparatus of FIG. 3. As shown in FIG. 4A, a transistor 404 is turned on/off by a standby power control signal at node N5, which is output from the control unit 308. Where the system 300 is in the normal operation mode, the standby power control signal at node N5 is low, so the transistor 404 is turned off. When the transistor 404 is turned off, a zener diode 402 is not electrically conducting, so the output voltage of the power supply unit 302 at node N7 is maintained at 12 volts DC. On the contrary, where the system 300 is in the standby mode, the standby power control signal at node N5 is high, so the transistor 404 is turned on. Where the transistor 404 is turned on, the zener diode 402 whose rated voltage is 5 volts is electrically conducting, so the output voltage at node N7 of the power supply unit 302 is restricted to 5 volts DC. The 5 volts DC are provided to the feedback control unit 310. The feedback control unit 310 observes the output voltage of the power supply unit 302, and stops the operation of the power supply unit 302 if the output voltage exceeds 5 volts. Capacitor 410 filters the power control signal at node N5. Resistors 406 and 408 limit a base current of the transistor 404 and establish a minimum voltage at the node N5 necessary to turn on the transistor 404.

Figure 4B:
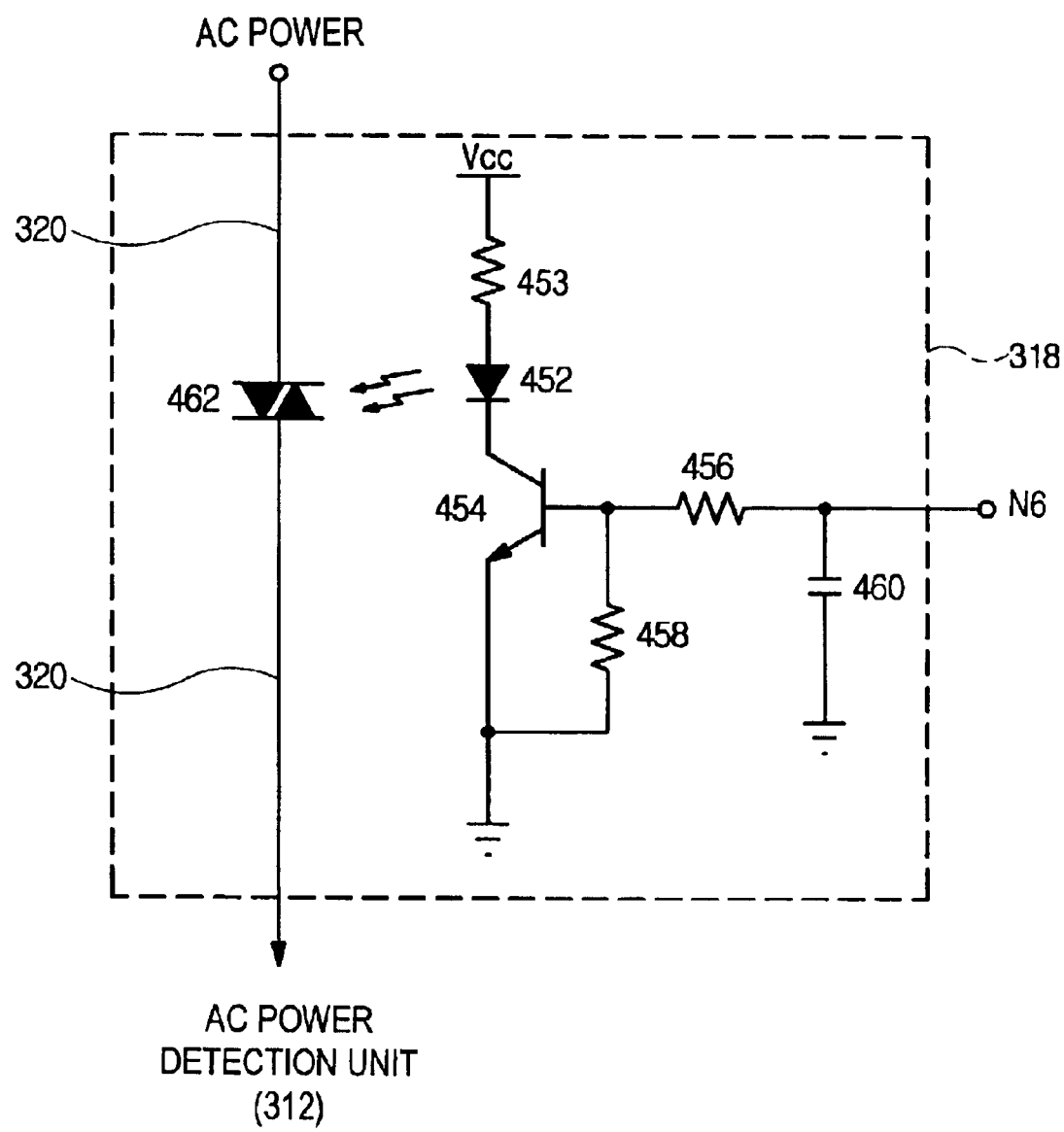
FIG. 4B is a circuit diagram illustrating a power cutoff unit of the standby power control apparatus shown in FIG. 3.

FIG. 4B is a circuit diagram illustrating a power cutoff unit 318 of the standby power control apparatus of FIG. 3. As shown in FIG. 4B, a photosensitive bi-directional three-terminal thyristor 462 is installed on an AC power transmission line 320 connecting the AC power detection unit 312 and the source of AC power. A light emitting diode 452 is employed as a light emitting device to drive the thyristor 462. Where the system 300 is in the normal operation mode, a power cutoff control signal at node N2 is high, so a transistor 454 is turned on. Where the transistor 454 is turned on, the light emitting diode 452 electrically conducts and emits light, which is transmitted into the thyristor 462, thereby turning the thyristor 462 on. Where the thyristor 462 is turned on, the AC power is provided to the AC power detection unit 312. On the contrary, where the system 300 is in the standby mode, the power cutoff control signal at node N6 is low, so the transistor 454 is turned off. Where the transistor 454 is turned off, the light emitting diode 452 does not electrically conduct and does not emit light, thereby turning the thyristor 462 off. Where the thyristor 462 is turned off, the AC power is not provided to the AC power detection unit 312. Capacitor 460 filters the power cutoff control signal at node N6. Resistors 456 and 458 limit a base current of the transistor 454 and establish a minimum voltage at the node N6 necessary to turn on the transistor 454. Resistor 453 connected between the light emitting diode 452 and a voltage source $V_{CC}$ limits a current flow through the light emitting diode 452.

FIGS. 5A through 5F are waveform diagrams illustrating the electrical characteristics of portions of the standby power control apparatus of FIG. 3, that is, voltage variations between the normal operation mode and standby mode at nodes N5 through N10 shown in FIG. 3. As shown in FIGS. 5A through 5F, where the system 300 is in the normal operation mode, the standby power control signal at node N5 and the power cutoff control signal at node N6, which are output from the control unit 308, are low (L) and high (H), respectively, prior to time $t_1$. In the normal operation mode, if a preset time Δt elapses after the operation of the system 300 is stopped, i.e., (interval $t_1$ to $t_2$), the system 300 is switched to the standby mode at time $t_2$.

Where the system 300 is switched to the standby mode (time $t_2$), the standby power control signal at node N5 and the power cutoff control signal at node N6, which are output from the control unit 308, are changed into a low level (L) and a high level (H), respectively. As the standby power control signal at node N5 is changed into a high level, the output voltage of the power supply unit 302 at node N7 is dropped to 5 volts DC from 12 volts DC by the driving of the standby power generation unit 316. Voltage at node N8 provided to the control unit 308 by the constant voltage unit 306 is always maintained at 5 volts regardless of the operation mode (normal operation or standby mode) of the system 300.

AC power at node N9 is supplied from the power cutoff unit 318 to the AC power detection unit 312. Where the system 300 is in the normal operation mode, normal AC power is provided to the AC power detection unit 312 by the power cutoff unit 318. However, where the system 300 is switched to the standby mode, the AC power is no longer provided to the AC power detection unit 312 by the cutoff operation of the power cutoff unit 318. Where the system 300 is again switched from the standby mode to the normal operation mode (time t3), the AC power is provided to the AC power detection unit 312.

A pulse signal at a node N1 is generated within the power supply unit 302. Where the system 300 is switched to the standby mode, the pulse width of the pulse signal becomes narrow, so the output voltage at node N7 is maintained at 5 volts DC. Thereafter, where the system 300 is again switched from the standby mode to the normal operation mode, the pulse width of the pulse signal at the node N10 becomes wide, so the size of the output voltage N7 is again maintained at 12 volts DC.

As shown in FIG. 5, where the system 300 is switched to the standby mode, the output voltage of the power supply unit 302 at node N7 is dropped to 5 volts DC from 12 volts DC and the AC power provided to the AC power detection unit 312 via transmission line 320 is electrically cut off, so the AC power is not provided to the AC power detection unit 312. Accordingly, there is no power consumption in the constant voltage unit 306 and the AC power detection unit 312.

Figure 6:
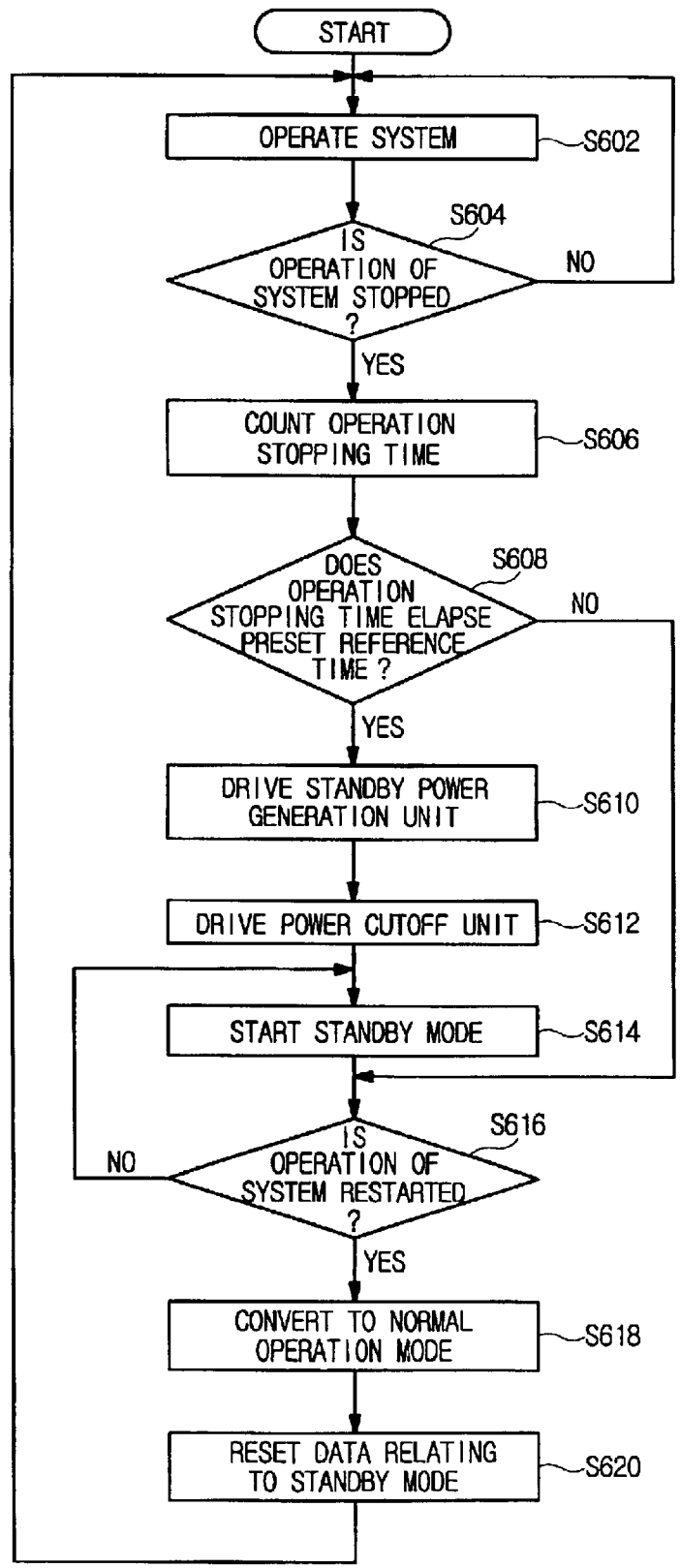
FIG. 6 is a flowchart illustrating an operation of the standby power control apparatus shown in FIG. 3.

FIG. 6 is a flowchart illustrating an operation of the standby power control apparatus of FIG. 3. As shown in FIG. 6, where the operation of the system 300 is stopped at operation S604 while the system 300 is in operation at operation S602, the operation stopping time of the system 300 is counted at operation S606.

Thereafter, it is determined whether the operation stopping time of the system 300 exceeds a preset reference time Δt at [step] operation S608. As the result of the determination at [step] operation S608, if the operation stopping time of the system 300 exceeds the preset reference time Δt, the output voltage of the power supply unit 302 at node N7 is dropped from 12 volts to 5 volts by the operation of the standby power generation unit 316 at operation S610. Accordingly, power provided to the constant voltage unit 306 is reduced. Additionally, unnecessary power consumption is also reduced by driving the power cutoff unit 318 at operation S612 to cut off power provided to the AC power detection unit 312. At the same time, where the system 300 is switched to the standby mode, the standby mode starts at operation S614. In this case, all component elements of the system 300 except the control unit 308, the standby power generation unit 316 and the power cutoff unit 318 are inactivated.

Thereafter, it is determined whether the system 300 is restarted at operation S616. As the result of the determination at operation S616, where external input occurs in the standby mode, the system 300 is switched to the normal operation mode at operation S618 and all the component elements of the system 300 are activated. Thereafter, the system 300 resets data relating to the standby mode at operation S620, and then a corresponding operation according to the external input is carried out at operation S620.

Accordingly, the standby power control apparatus and method of the present invention reduces unnecessary power consumption and heat generation in the constant voltage unit 306 by dropping the output voltage of the power supply unit 302 to the operation voltage of the control unit 308 where the system 300 is switched to the standby mode to save power.

Additionally, the standby power control apparatus and method of the present invention suppress unnecessary power consumption in the standby mode by cutting off AC power provided to the AC power detection unit so as to observe whether the AC power is normal.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus for controlling standby power of a system, the apparatus comprising:
    a control unit which controls an overall operation of the system;
    a power supply unit which converts an Alternating Current (AC) voltage into a Direct Current (DC) voltage and outputs the DC voltage to a load;
    a constant voltage unit which drops the DC output voltage of the power supply unit and provides the control unit with the dropped output voltage;

a standby power generation unit which drops the DC output voltage of the power supply unit from a first value to a second value lower than the first value if the system is switched to a standby mode; and a feedback control unit which stops an operation of the power supply unit if the output DC voltage of the power supply unit exceeds a preset reference, wherein the standby power generation unit comprises:

a voltage dropping element which drops the output DC voltage of the power supply unit to the second value where the system is in the standby mode, and a switching element which feeds back the output DC voltage of the power supply to the feedback control unit by being turned on by the control unit where the system is in the standby mode.

2. The apparatus according to claim 1, wherein the voltage dropping element comprises a constant voltage element.

3. The apparatus according to claim 2, wherein the constant voltage element comprises a zener diode.

4. The apparatus according to claim 3, wherein a rated voltage of the zener diode has a value between an operating voltage of the control unit and the first value.

5. The system according to claim 1, further comprising:

an AC power detection unit which receives the AC power and observes whether the AC power is normal; and a power cutoff unit which cuts off the AC power input to the AC power detection unit.

6. An apparatus for controlling standby power of a system, the apparatus comprising:

a control unit which controls an overall operation of the system;

a power supply unit which converts an Alternating Current (AC) voltage into a Direct Current (DC) voltage and outputs the DC voltage to a load;

a constant voltage unit which drops the DC output voltage of the power supply unit and provides the control unit with the dropped output voltage; and a standby power generation unit which drops the DC output voltage of the power supply unit from a first value to a second value lower than the first value if the system is switched to a standby mode;

an AC power detection unit which receives the AC power and observes whether the AC power is normal; and a power cutoff unit which cuts off the AC power input to the AC power detection unit, wherein the power cutoff unit comprises a bi-directional switch serially connected with an input of the AC power detection unit, the bi-directional switch being activated where the system is in a normal operation mode and being inactivated where the system is in the standby mode.

7. The apparatus according to claim 6, wherein the bi-directional switch comprises:

a light emitting device which electrically conducts and emits light where the system is in the normal operation mode; and a photosensitive bi-directional switch element which electrically conducts in response to the emitted light.

8. The apparatus according to claim 7, wherein the light emitting device comprises a photodiode and the bi-directional switch element comprises a bi-directional three-terminal thyristor.

9. The apparatus according to claim 8, wherein:

the photodiode is supplied at an anode with the output DC voltage and grounded at a cathode through a transistor, and the transistor is turned on where the system is in the normal operation mode so the photodiode electrically conducts and is turned off where the system is in the standby mode so the photodiode does not electrically conduct.

10. The apparatus according to claim 9, wherein the turning on/off of the transistor is controlled by the control unit.

* * * * *

UNITED STATES PATENT AND TRADEMARK OFFICE
CERTIFICATE OF CORRECTION

PATENT NO. : 6,909,621 B2
DATED : June 21, 2005
INVENTOR(S) : Seung-kwan Lee

It is certified that error appears in the above-identified patent and that said Letters Patent is hereby corrected as shown below:

Title page,
Item [75], Inventor, change "Suwon" to -- Suwon-city --.

Signed and Sealed this

Eleventh Day of April 2006

JON W. DUDAS
*Director of the United States Patent and Trademark Office*